Jan. 31, 1961    M. G. SHENIGO    2,969,630
APPARATUS FOR PACKAGING PALLET-MOUNTED BULKY OBJECTS
Filed Nov. 12, 1959    15 Sheets-Sheet 2
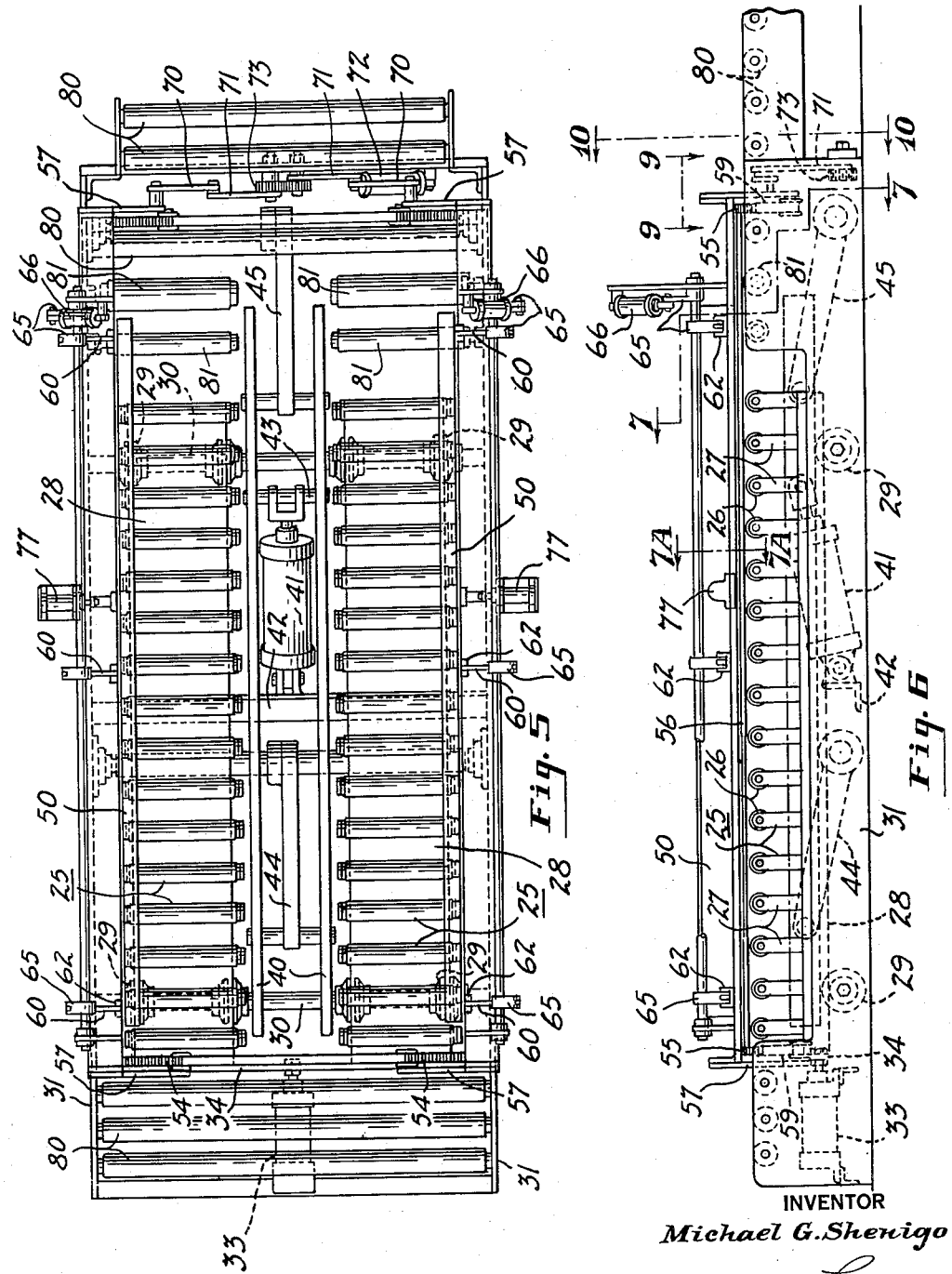
INVENTOR
*Michael G. Shenigo*
BY *Evans & Pearne*
ATTORNEYS

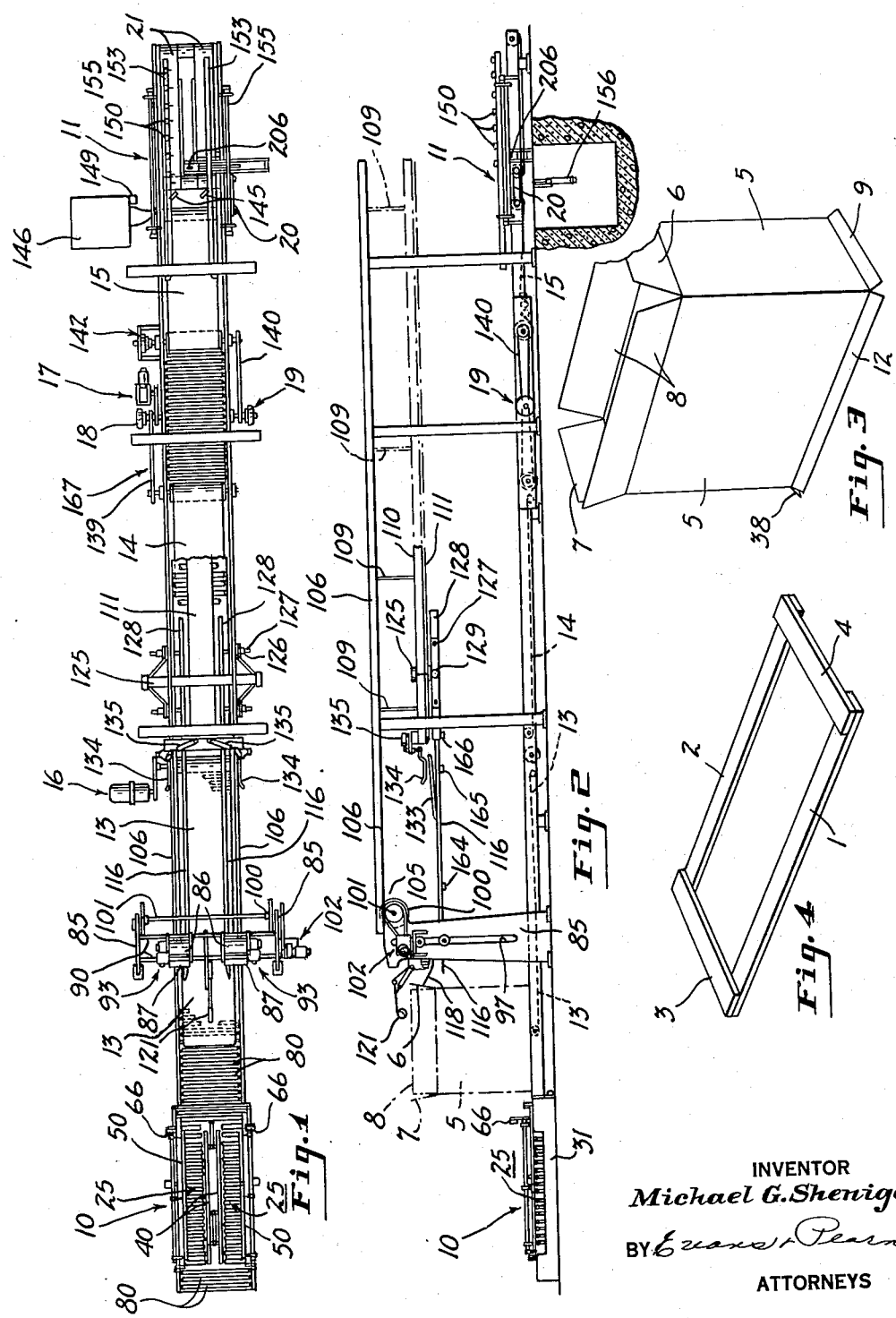

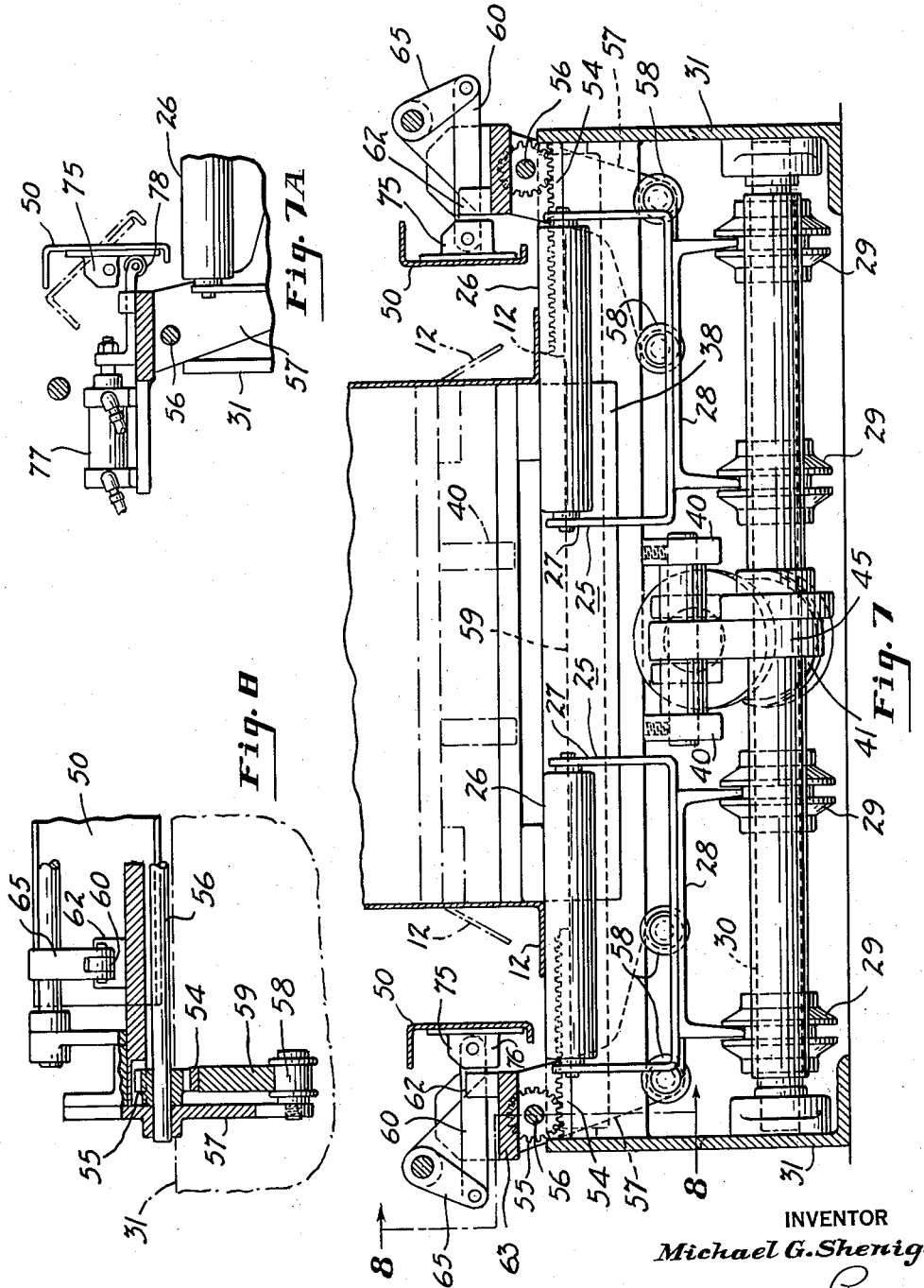

Jan. 31, 1961   M. G. SHENIGO   2,969,630
APPARATUS FOR PACKAGING PALLET-MOUNTED BULKY OBJECTS
Filed Nov. 12, 1959   15 Sheets-Sheet 4
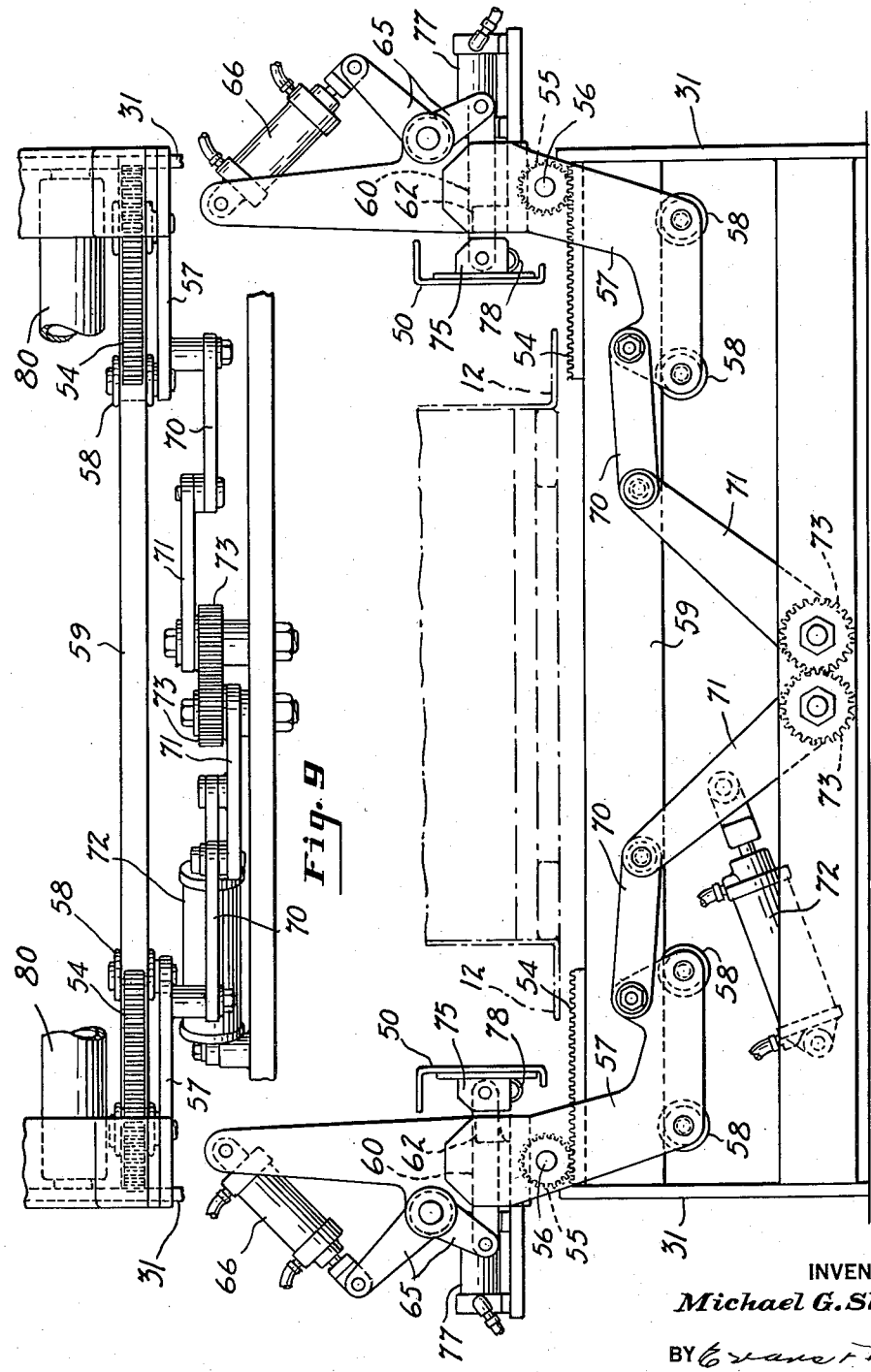
INVENTOR
Michael G. Shenigo
BY Evans + Pearne
ATTORNEYS

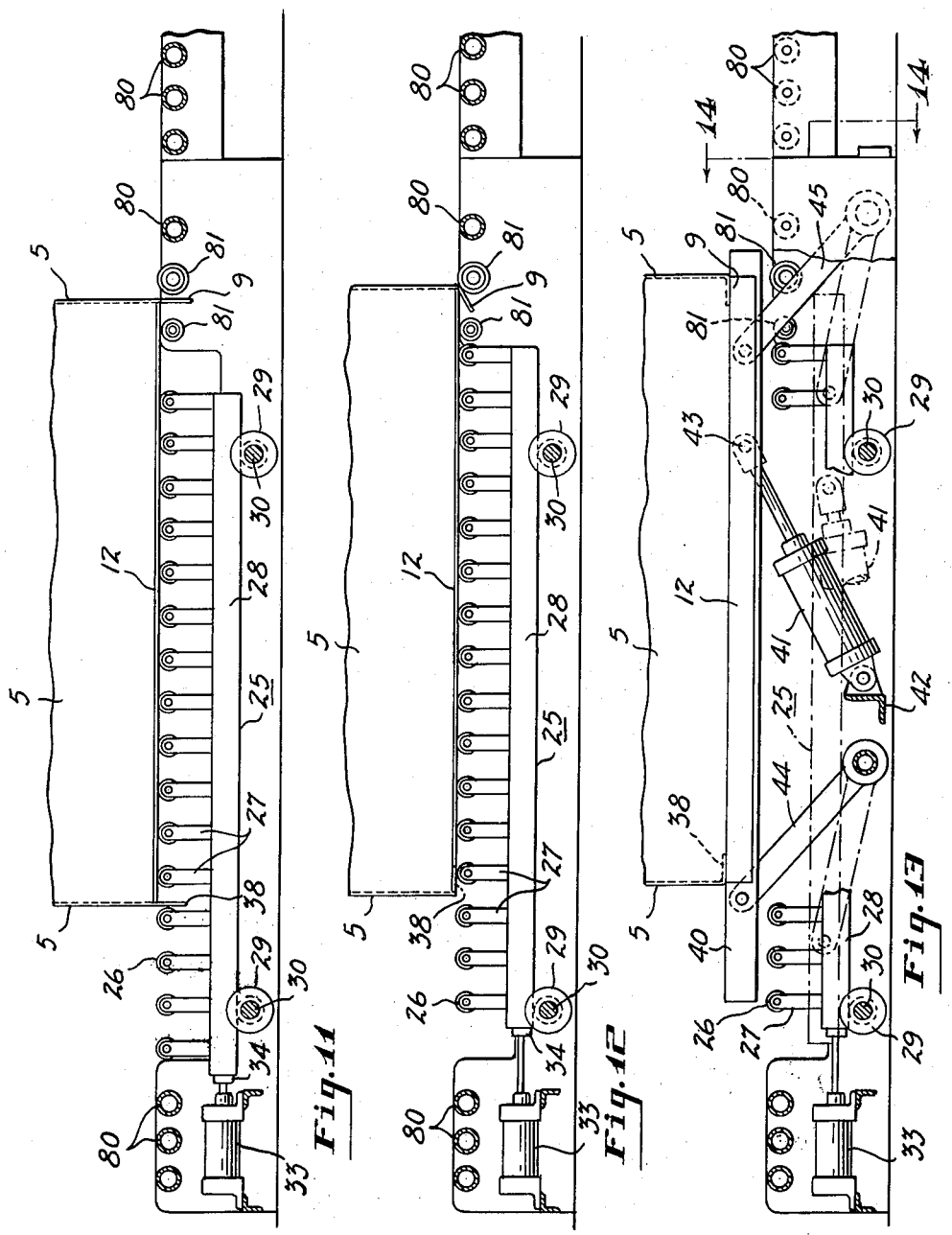

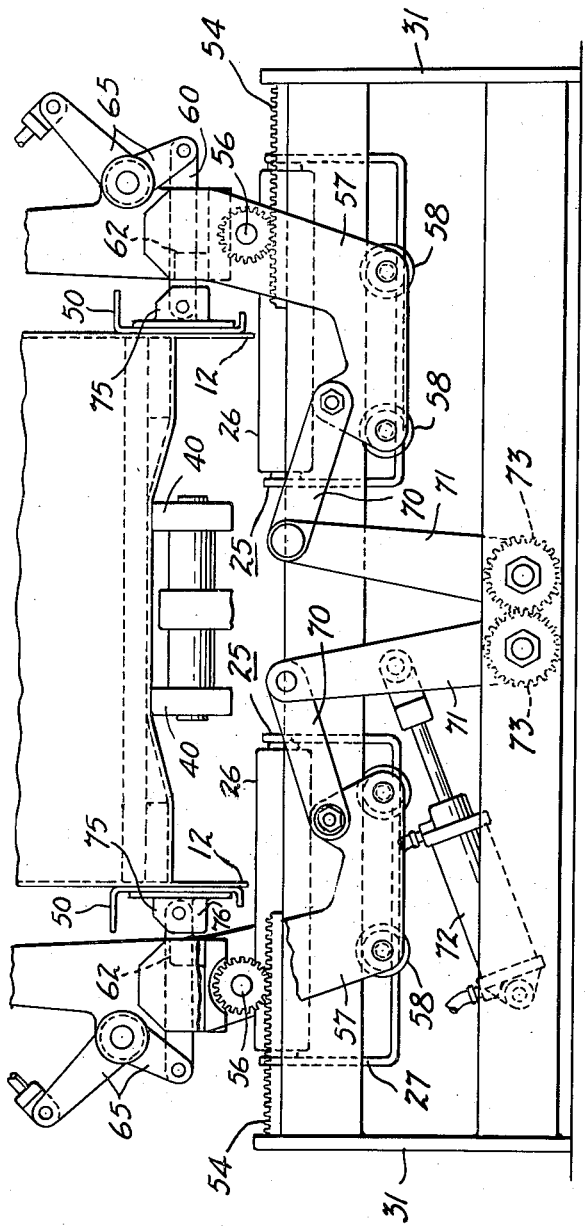
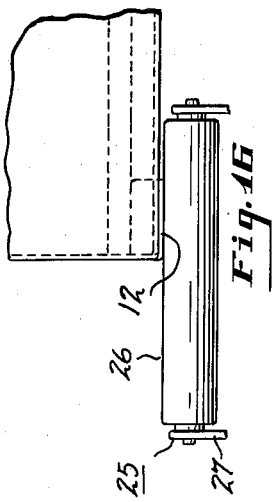
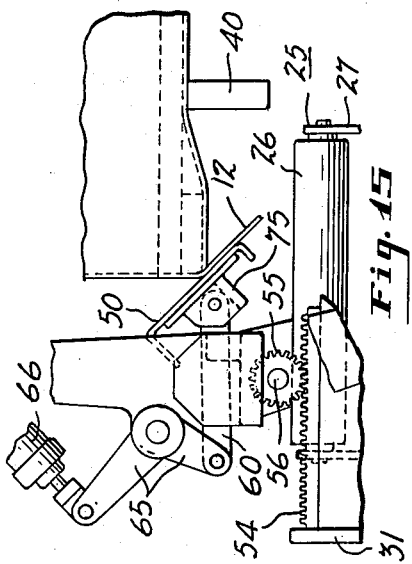

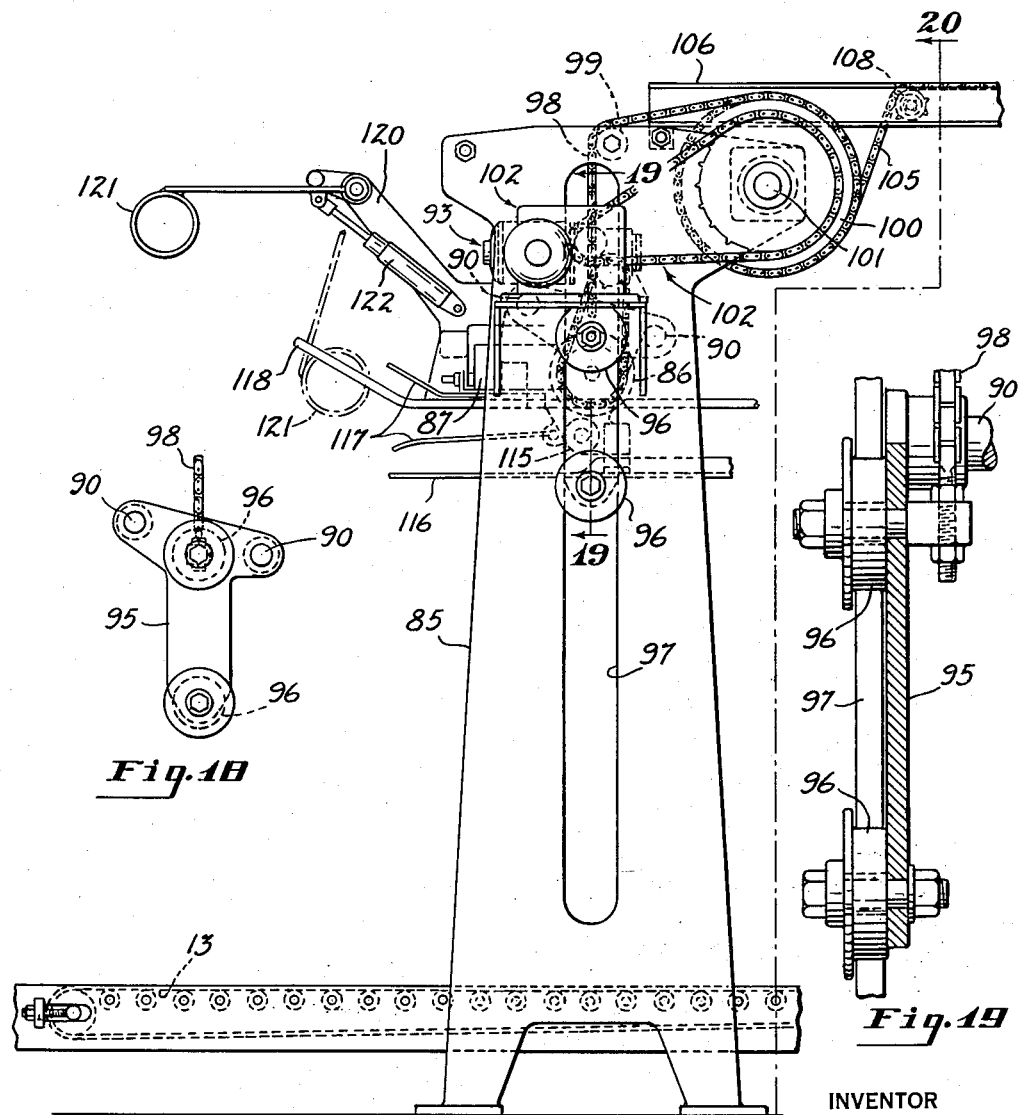

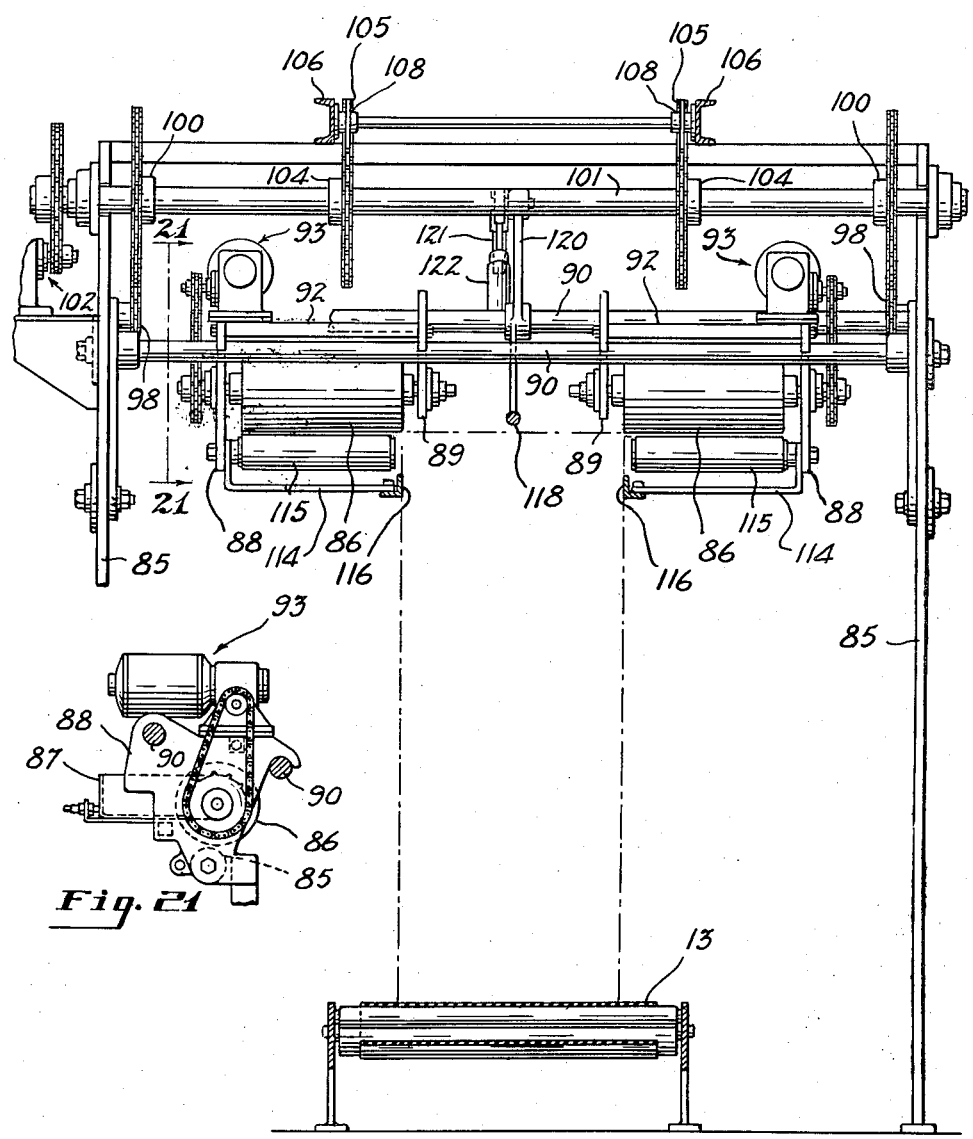

Jan. 31, 1961  M. G. SHENIGO  2,969,630
APPARATUS FOR PACKAGING PALLET-MOUNTED BULKY OBJECTS
Filed Nov. 12, 1959  15 Sheets-Sheet 9

INVENTOR
Michael G. Shenigo
BY Evans & Pearne
ATTORNEYS

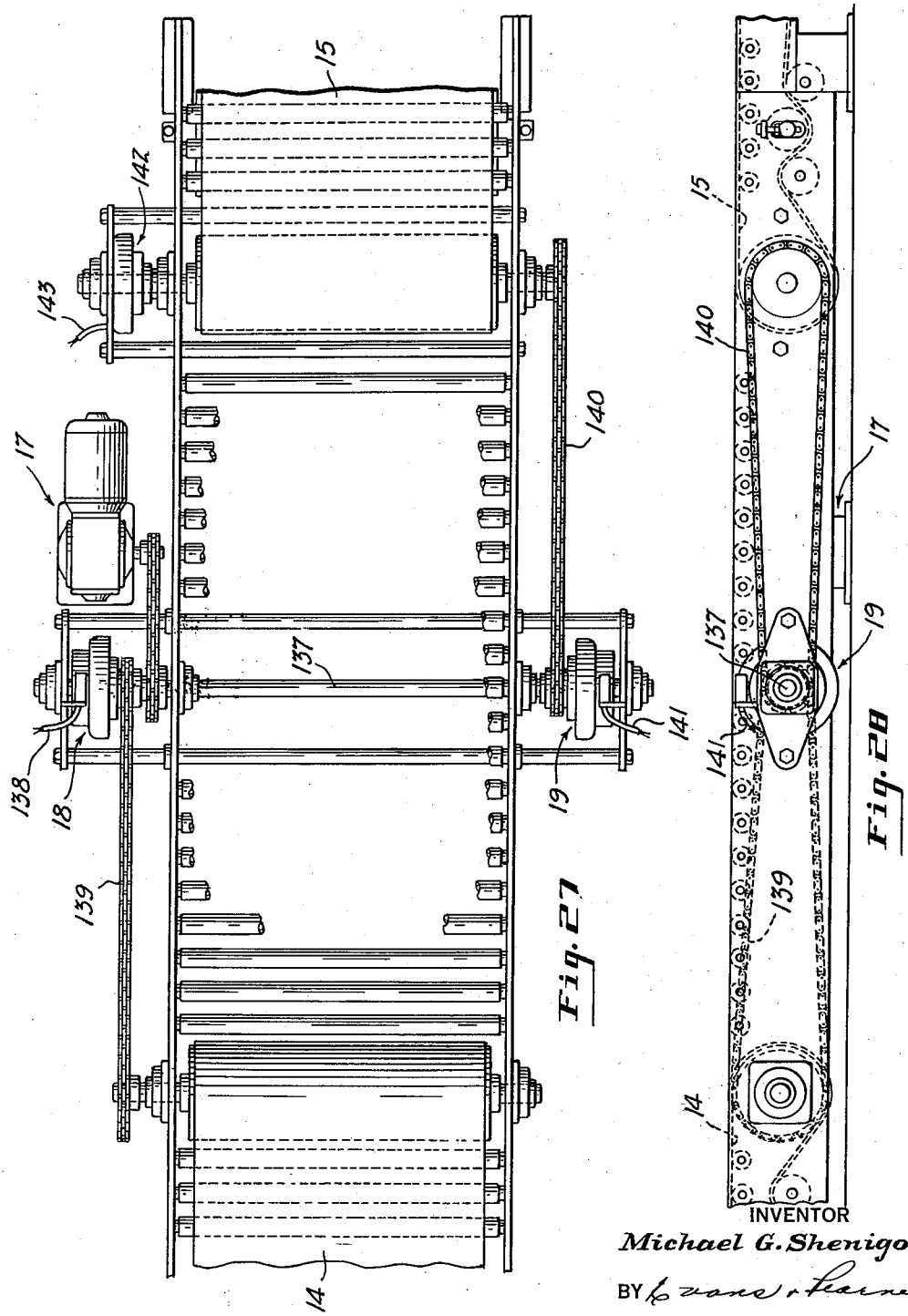

Jan. 31, 1961  M. G. SHENIGO  2,969,630
APPARATUS FOR PACKAGING PALLET-MOUNTED BULKY OBJECTS
Filed Nov. 12, 1959  15 Sheets-Sheet 12
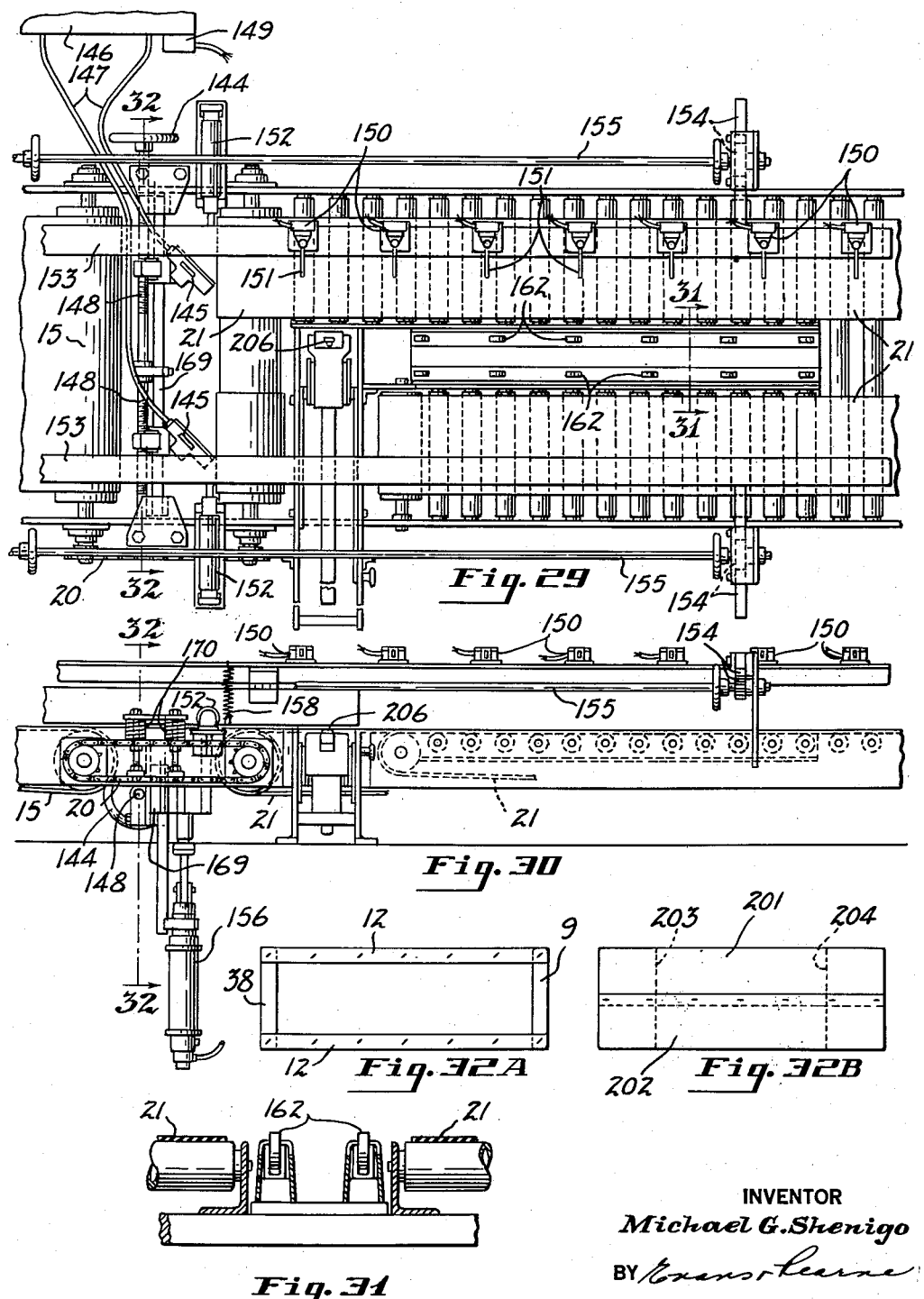
INVENTOR
Michael G. Shenigo
BY
ATTORNEYS Jan. 31, 1961 M. G. SHENIGO 2,969,630
APPARATUS FOR PACKAGING PALLET-MOUNTED BULKY OBJECTS
Filed Nov. 12, 1959 15 Sheets-Sheet 13

INVENTOR
*Michael G. Shenigo*
BY *Evans + Hearn*
ATTORNEYS

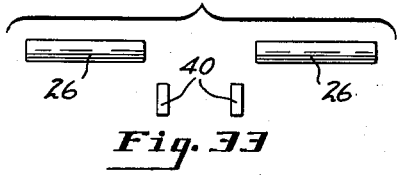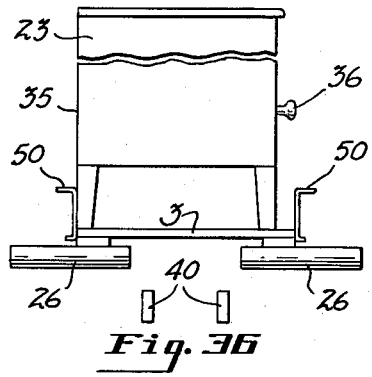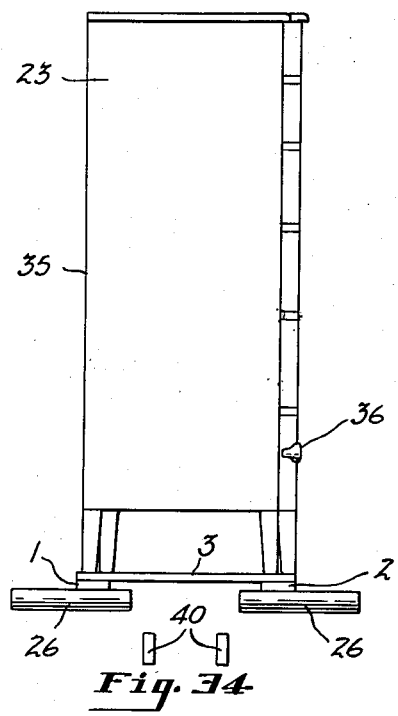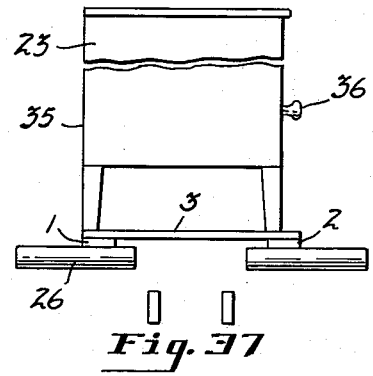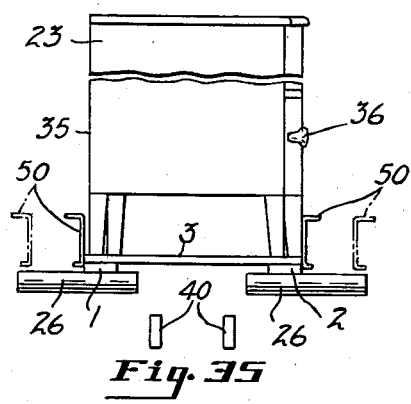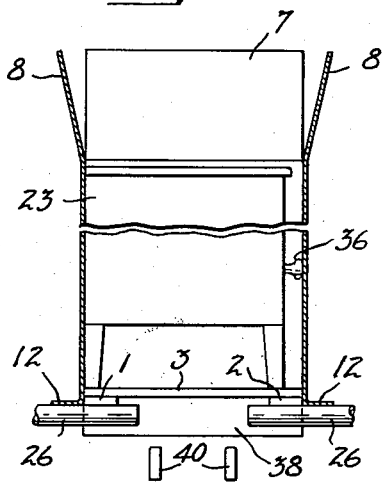

Jan. 31, 1961 M. G. SHENIGO 2,969,630
APPARATUS FOR PACKAGING PALLET-MOUNTED BULKY OBJECTS
Filed Nov. 12, 1959 15 Sheets-Sheet 15

INVENTOR
Michael G. Shenigo
BY
ATTORNEYS

United States Patent Office 2,969,630
Patented Jan. 31, 1961

2,969,630

APPARATUS FOR PACKAGING PALLET-MOUNTED BULKY OBJECTS

Michael G. Shenigo, Sandusky, Ohio, assignor to West Virginia Pulp and Paper Company, New York, N.Y., a corporation of Delaware Filed Nov. 12, 1959, Ser. No. 852,555

21 Claims. (Cl. 53—138)

This invention relates to packaging apparatus and particularly to apparatus for packing large and heavy articles, such as furniture, in paperboard cartons in such a manner that the furniture is supported on rigid wooden platforms or pallets or the like and is surrounded on its top and on all sides with protective paperboard walls.

The advantages of replacing lumber crates and other costly and cumbersome packaging containers with paperboard cartons has resulted in a trend toward the use of paperboard for packaging an increasing variety of products. In keeping with this trend, paperboard has been employed for packing furniture. However, a difficulty in packing large bulky furniture has been the necessity for palletizing the furniture and the difficulty of inverting large or heavy pieces in order to properly associate them with supporting pallets and enclose them in protective containers.

The present invention contemplates apparatus which accomplishes the packaging of heavy articles of furniture or the like in paperboard cartons in supported relationship on wooden palelts or the like. In one aspect, the invention contemplates apparatus which is adaptable for quick changeovers for accommodating articles and cartons of a variety of dimensions. This latter feature is of importance in many furniture manufacturing operations because typically a variety off urniture pieces are produced at a given plant and it is desirable to package all these different pieces on the same packaging line.

Another object of the invention is the accomplishment of enclosure of pallet-mounted bulky objects in paperboard containers in a relationship whereby the paperboard containers are firmly stapled to the pallets which support the bulky objects in such a way as to completely protect the bulky objects.

Another more specific object of the invention is to accomplish such enclosing in part by underfolding of the lowermost carton flaps in such a manner as to avoid any requirement for inverting the bulky objects being packaged while at the same time accomplishing the inclusion of the pallets between the lower carton flaps and the bulky objects being packaged.

These and other objects and advantages of the invention will become apparent from the following description of one example of the invention. This example illustrates presently preferred means and apparatus which will enable others to practice the invention if desired for purposes of evaluation and experimental trial, either by duplication of the illustrated means and apparatus or models thereof, or by alteration of specific details thereof to provide alternative means embodying the principles and teaching of the invention.

Figure 1 is a plan assembly view of apparatus embodying the invention.

Figure 2 is a side elevation of the apparatus shown in Figure 1.

Figure 4 is a perspective view of a pallet of a type contemplated for use in the apparatus of the invention.

Figure 5 is an enlarged plan view of the left-hand end of the apparatus seen in Figure 1.

Figure 6 is a side elevation of the apparatus shown in Figure 5.

Figure 7 is a cross-section taken on line 7—7 in Figure 6.

Figure 7A is a detail fragmentary cross-section taken on the line 7A—7A in Figure 6.

Figure 8 is a fragmentary cross-section taken along the line 8—8 of Figure 7.

Figures 9 and 10 are views taken respectively from lines 9—9 and 10—10 in Figure 6.

Figure 11 is a cross-sectional elevation taken on a vertical plane extending along the length of the station shown in Figures 5 and 6.

Figure 12 is a view similar to Figure 11 showing an alternate position of the parts.

Figure 13 is a similar view showing still another alternate position of the parts.

Figure 14 is a view taken on line 14—14 of Figure 13.

Figure 15 is a fragmentary view similar to the left-hand portion of Figure 14 but on a somewhat enlarged scale and showing an alternate position of the parts.

Figure 16 is a fragmentary view showing some of the elements shown in Figure 15 in still another position of the parts.

Figure 17 is an enlargment of the apparatus shown at the left center portion of the length of Figure 2.

Figure 18 is a detailed view of a portion of certain apparatus included in the showing of Figure 17.

Figure 19 is an enlarged detailed view taken on line 19—19 of Figure 17.

Figure 20 is an elevational view taken on line 20—20 of Figure 17.

Figure 21 is a detailed view taken on line 21—21 of Figure 20.

Figure 22:
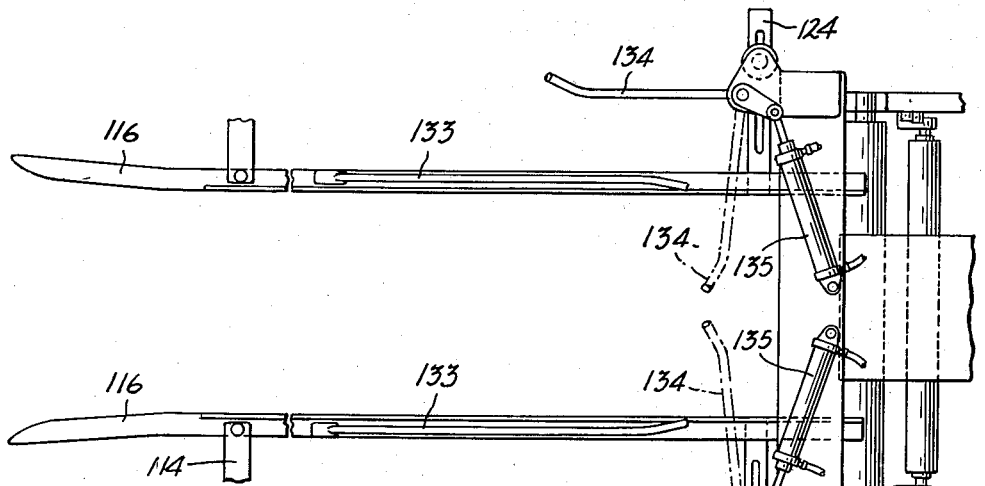
Figure 23:
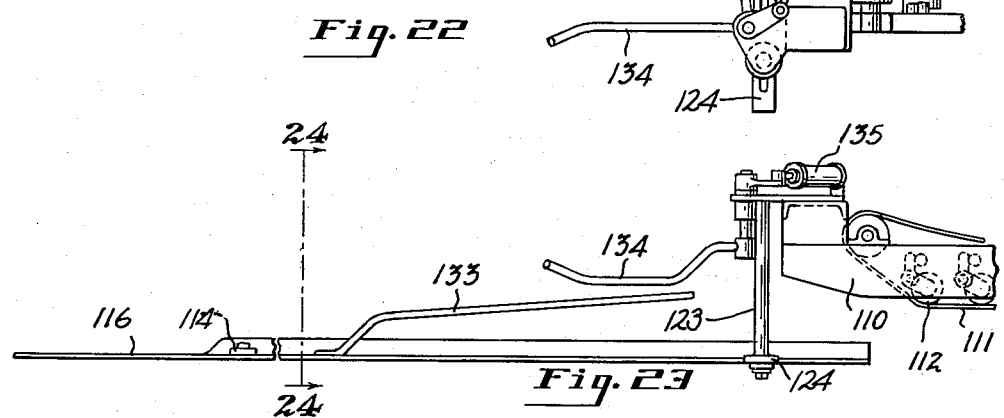

Figures 22 and 23 are respectively plan and side elevational views on an enlarged scale of apparatus illustrated at the portion of Figure 2 just to the left of center.

Figure 24:
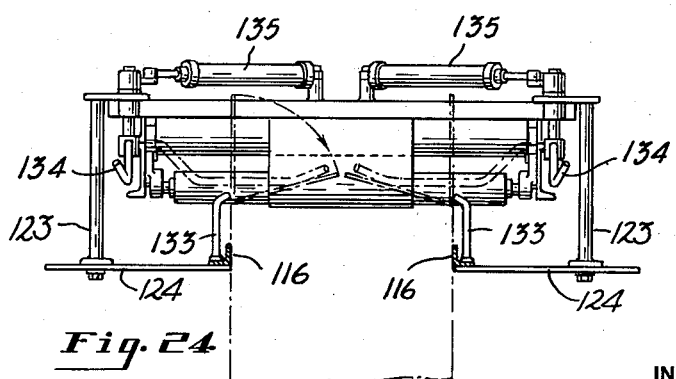

Figure 24 is a view taken on line 24—24 of Figure 23.

Figure 25:
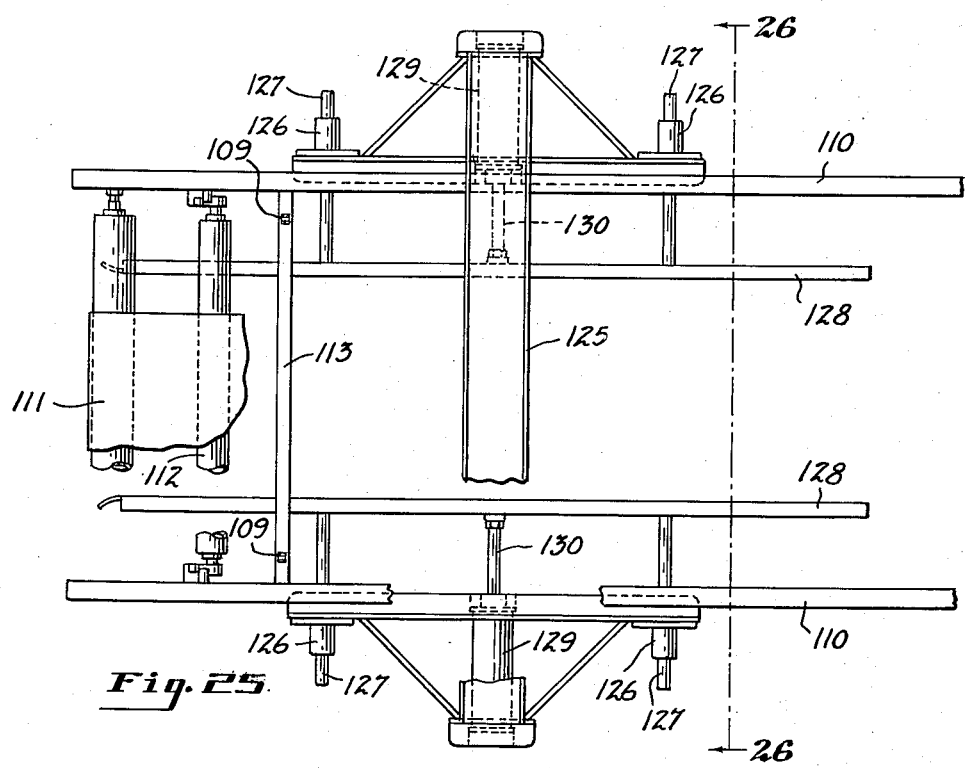

Figure 25 is a plan view showing apparatus immediately "downstream" of that illustrated in Figure 22.

Figure 26:
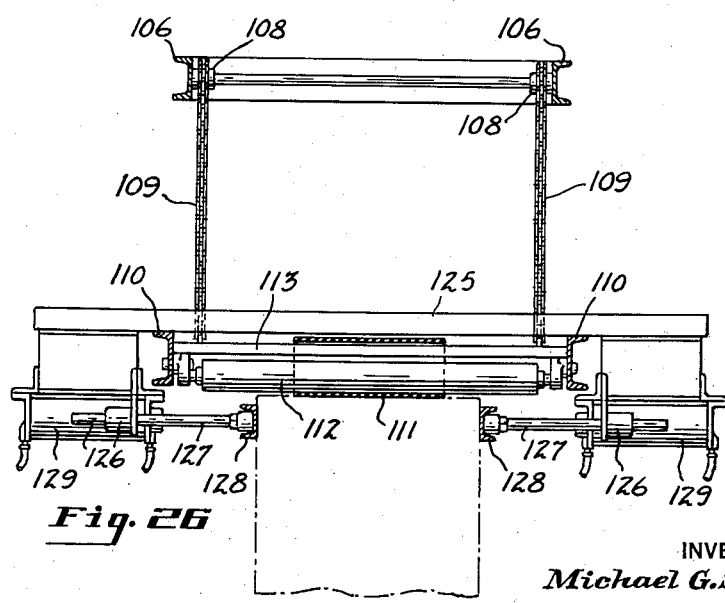

Figure 26 is a cross-section taken on line 26—26 of Figure 25.

Figure 27 is a plan view of an enlarged scale of the portion of the aparatus shown somewhat to the right of center in Figure 1.

Figure 28 is a side elevation of the apparatus shown in Figure 27.

Figure 29 is a plan view of the portion of the apparatus shown at the right-hand end of Figure 1.

Figure 30 is a side elevation of the apparatus shown in Figure 29.

Figure 31 is a fragmentary view taken on line 31—31 in Figure 29.

Figure 32 is a view taken on line 32—32 of Figure 29.

Figure 32A illustrates the underside of a palletized package which has passed through the apparatus contemplated by the invention.

Figure 32B illustrates the underside of a package which is stapled on a line embodying the apparatus of the present invention but which package is not palletized as contemplated by the present invention.

Figures 33–47, inclusive, are schematic illustrations showing generally the same portion of the apparatus as Figures 14 or 15 and illustrating a sequence of operations in the use of the apparatus as contemplated by the invention.

In order to facilitate and condense description of the invention, the following discussion of the drawings will specify reference numerals for the various parts and in parentheses will specify by number the figure or figures of the drawings in which such reference numerals may be found. For example, "flanged wheels 29 (6, 7, 11–13)" signifies that the particular part referred to is given the reference numeral 29 and is to be conveniently found in Figures 6, 7, and 11–13.

*General organization of the apparatus*

The apparatus includes conveyor line means comprising in the particular apparatus illustrated roller conveyor segments and belt conveyor segments, which together comprise a series of underside-engaging work-supporting conveyor elements leading in a conveying path past a loading station generally indicated by the reference numeral 10 (1, 2) and past stations for infolding, gluing and sealing top flaps of those paperboard cartons employed in the invention which have unsealed top flaps, and also past a stapling station 11 which is at the downstream end of the illustrated apparatus. The top flap infolding, gluing and sealing means including folding or plowing elements, glue rolls, squaring bars, hold-down rolls and the like are positioned between the stations 10 and 11 in the particular apparatus illustrated.

Included in the belt conveyors of the conveyor line in the particular apparatus illustrated are the belts 13 (1, 2, 17, 20), 14 (1, 2, 25, 27, 28) and 15 (1, 2, 27, 28, 29). The belt 13 runs constantly; and the belts 14 and 15 operate intermittently with differing intermittent movements, all as described below. The belt 13 is powered from a motor and speed reducer 16 (1); and the belts 14 and 15 are powered by the motor 17 through, respectively, the brake-clutch linkages generally indicated by the reference numerals 18 and 19. The downstream end of the belt 15 is linked through a drive chain 20 (30) to a pair of laterally spaced apart belts 21 (1, 29–31).

Objects to be packaged, such as dressers or other relatively heavy furniture, are mounted on pallets as they are received at the packaging apparatus contemplated by the invention. A typical pallet is illustrated in Figure 4 and may comprise merely an open rectangular frame of wool including lower side members 1 and 2 and upper end members including a rearward end member 3 and a forward end member 4.

Figure 3C:
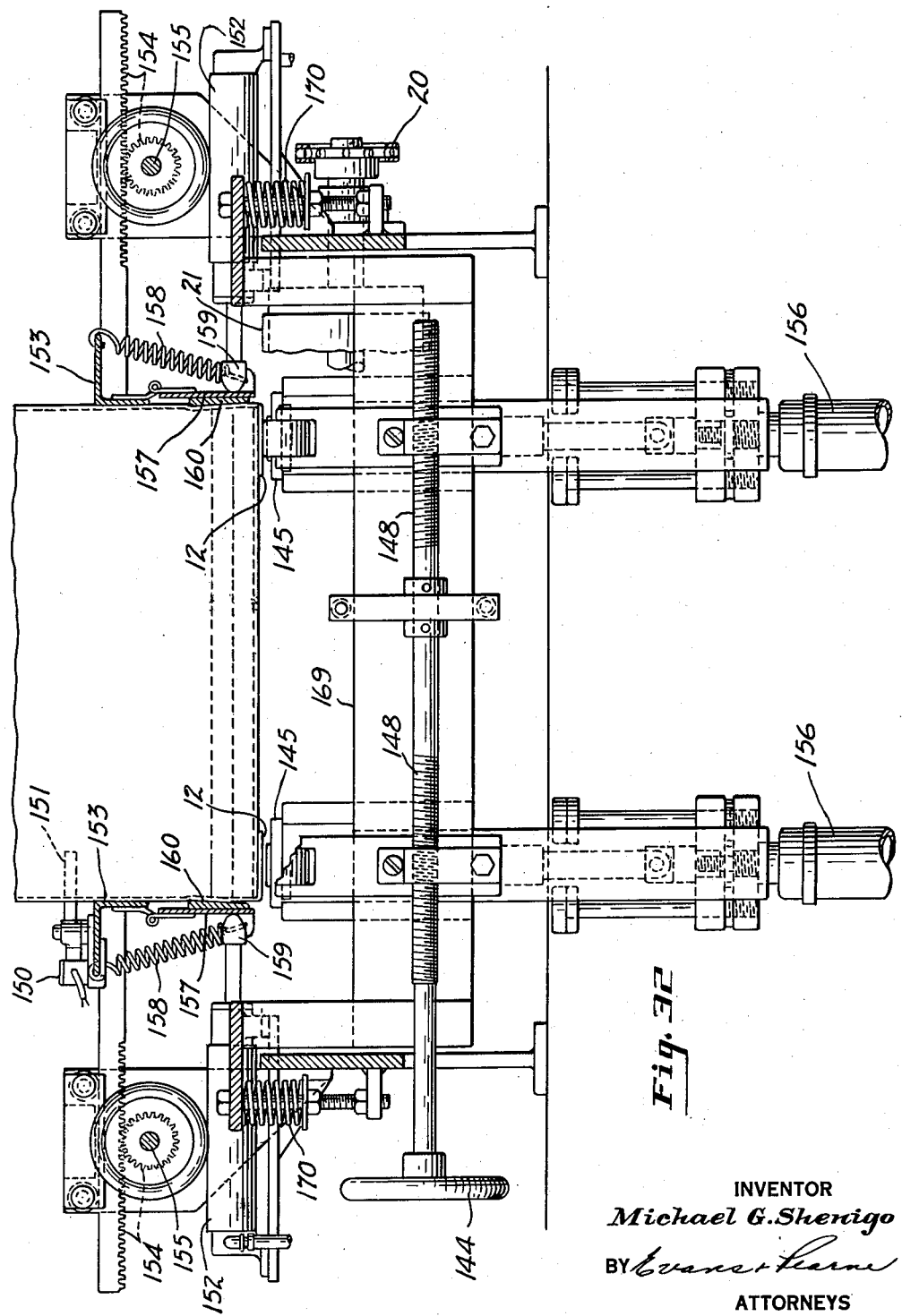
Figure 3 is a perspective view of a carton of the type contemplated for use in the apparatus of the invention.
Figure 39:
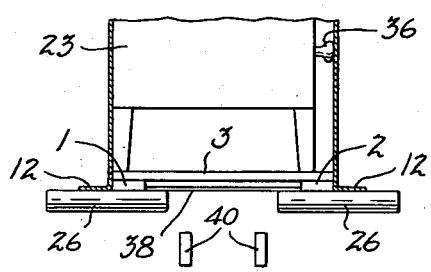

At the loading station, cartons are introduced to the apparatus by being inserted over the pallet-mounted furniture pieces. A typical paperboard carton is illustrated in Figure 3 and includes a rectangular tubular portion comprising the panels 5. Such tubular portion has at its upper end upstanding flaps including a forward flap 6, a rearward flap 7 and sideward flaps 8. The carton also has at its lower end flaps of relatively narrower dimensions including a forward flap 9 and a rearward flap 38 and sideward flaps including a flap 12 seen in Figure 3 and a similar flap on the other side of the carton but not visible in Figure 3.

*Loading station*

The conveyor elements at the carton loading station include a pair of roller conveyor sub-assemblies generally indicated by the reference numeral 25 (1, 5–7, 11–16). The roller conveyor sub-assemblies extend parallel to each other in the conveying direction in laterally spaced relationship to define a gap therebetween as seen in the drawings. Each of the pair of roller conveyor sub-assemblies includes a plurality of spaced foreshortened conveyor rolls 26 (5–7, 11–16) carried on straps 27 which in turn are carried on reciprocating beams 28 (2, 7, 11–13). The flanges of the reciprocating beams 28 are received in flanged wheels 29 (6, 7, 11–13) which are keyed to shafts 30 (5, 7). The roller conveyor sub-assemblies 25 are reciprocated on the flanged wheels 29 by means of the actuating cylinder 33 (5, 6, 11–13), the actuating shaft of which is operatively attached to each of the beams 28 by a cross bar 34 (5, 11). The shafts 30 are carried in bearings mounted on the fixed frame structure 31 (5–7).

Pallet lifter members 40 (1, 5, 7, 13–15, 33–47) are provided which extend upwardly at the carton loading station 10 through the gap defined between the roller conveyor sub-assemblies 25 from the level of the roller conveyor means. To this end there is provided a linkage most clearly seen in Figures 5 and 13 and including an actuating cylinder 41 pivoted at its lower end to a fixed frame element 42 and at its upper end to a shaft 43 rigidly affixed between the pallet lifter members 40. The pallet lifter members 40 are maintained level in their up and down movement by the end links 44 and 45.

Provided on either side of the carton loading station 10 are parallel clamping bars 50 (5, 7, 10, 14, 15) which in the illustrated apparatus are oriented longitudinally of the conveyor line means at the loading station on either side thereof. The clamping bars 50 have opposed clamping faces. Clamping bar linkage means are provided for moving the clamping bars 50 toward and away from each other in clamping and unclamping directions respectively above the level of the conveyor elements at the loading station 10. In this connection there are provided fixed transversely oriented frame-carried racks 54 (9, 10) one pair of which may be seen in Figures 9 and 10 and another pair of which is provided at the opposite end of the loading station and is shown on a smaller scale in Figure 5.

The racks 54 are engaged by gears 55 (10) carried on shafts 56 journalled in carriage frame assemblies 57. The carriage frame assemblies 57 are provided on their lower portions with guide rolls 58 which engage the undersides of transverse frame beams 59 on which the racks 54 are rigidly mounted. Each clamping bar 50 is pivoted to sliding links 60 which are slidably received on guide members suitably defined or supported on the carriage assemblies 57. Such guide members are shown in the illustrated apparatus in the form of collars or guide blocks 62 (5–7, 10, 14) which slidably receive the linkage 60 and which are themselves affixed to the longitudinal beam portions 63 (7) of the carriage frame assemblies 57. The outer ends of the linkages 60 are attached through a bellcrank linkage 65 to double-acting air cylinders 66 which may be expanded by air pressure to cause the clamping bars 50 to move inwardly with respect to the carriage frame assemblies 57 to the limit of the sliding motion of the linkages 60 or until a force is encountered sufficient to overcome the expanding force exerted by the air cylinders 66. The air cylinders 66 and the remainder linkages associated therewith as above described thus constitute in this apparatus a lost-motion means as between bodily translation of the carriage assembly frames 57 and the associated clamping bars 50. The carriage assembly frames 57 are coordinated with each other through the links 70 and 71 (10). One of the links 70 is actuated directly by the double-acting actuating cylinder 72 and the other of the links 71 is actuated through the spur gears 73. The clamping force exerted by expansion of the cylinder 72 may be greater than that exerted by expansion of the cylinders 66.

The sliding links 60 are pivoted at their inner ends to the parallel clamping bars 50. In the illustrated apparatus the arrangement is such that the clamping bars are mounted for pivotal movement about axes extending longitudinally thereof from attitudes in which the clamping faces are vertical as illustrated, for example, in Figure 14 to attitudes in which the clamping faces slant upwardly as illustrated, for example, in Figure 15. To this end pivot collars 75 which are behind and affixed to the clamping bars 50 may be arranged to interfere with the linkages 60 in such a manner that the limiting vertical position of the clamping bars is defined, as will be clear for example from Figure 14 where the lower wall 76 of the pivot collar 75 interferes with the linkage 60 so as at all times to prevent the clamping bar 50 at the left side of Figure 14 from moving clockwise from the illustrated vertical position.

In the illustrated apparatus, subsidiary linkage means is provided for yieldingly urging the clamping bars to pivot toward the attitude in which the clamping faces slant upwardly. There are provided air cylinders 77 (5, 6, 10, 14, 15), the actuating rods of which have rollers 78 (10) mounted at their outer end adapted to engage the back sides of the clamping bars 50.

In addition to the roller conveyor sub-assemblies 25 at the loading station 10 there are provided other roller conveyor rollers such as the rollers 80 (5, 11–13) at the input and output ends of the station and also cantilevered rollers 81 (5, 11–13).

*Intermediate glue-applying and tap-flap-sealing stations*

In the downstream direction from the loading station 10 along the conveyor line is located a glue roll stand comprising the side plates 85 (17, 20) on which are adjustably mounted the glue rolls 86 (17, 20, 21). The glue rolls and their associated glue trays 87 (21) are mounted between outboard hanger plates 88 (20) and inboard hanger plates 89 (21) which are slidably and adjustably supported on a pair of rods 90 extending between vertically adjustable plates 95 (18, 19) mounted in the side plates 85 in a manner to be described below. Each associated pair of hanger plates 88 and 89 is fixed together by the tie rods 92 (20) and each associated glue roll is independently powered by its own adjustable speed drive comprising a motor and a speed changer and indicated generally by the reference numeral 93.

The vertically adjustable plates 95 are provided with guide wheels 96 which are guidedly received in the slots 97 formed in the side plates 85. Each of the sub-assemblies comprising a vertically adjustable plate 95 and guide wheels 96 hangs from one of two chain portions 98 (17–20). The two chain portions 98 pass over small sprockets 99 (17) and are taken up on large sprockets 100 keyed to a shaft 101 (20). The shaft 101 is rotatable for adjustment purposes by means of an adjustment motor and drive indicated generally by the reference numeral 102 (20). Also keyed to the shaft 101 are a pair of inboard sprockets 104 which are associated in take-up relationship with chains 105 which extend in the downstream direction generally along a fixed top frame 106 (2, 20, 26). The chains 105 pass over sprockets 108 (17, 20) and thence in the downstream direction and are connected through intervening coupling bars with hanger chain portions 109 (2). This hanging arrangement with the provision of coupling bars may be identical with that illustrated in U.S. Patent No. 2,891,367 and particularly Figure 20 thereof.

The hanger chains 109 support an adjustable upper frame 110 (2, 26) which is provided with its own endless belt 111 (23), the lower reach of which is backed by a plurality of transversely extending rolls such as the roll 112 which are mounted to pivot with a slight up-and-down movement as seen in Figure 23. The side frame members of the frame 110 are held together by transversely extending tie bars 113 (25, 26). It will be understood that the belt 111 and rolls 112 constitute compressing means for holding down glued carton flaps during setting of the glue as the cartons pass along the conveying means underneath the belt 111.

Mounted in associated with each of the glue rolls 86 and cantilevered on the outboard plate 88 associated therewith are backing rollers 115 (20) adapted to urge the flaps of passing cartons firmly against the glue rolls 86. Carried in association with each slidable adjustable sub-assembly 86, 88, 89 are plow members and side guides which are automatically adjusted in correct position as the sub-assemblies are shifted along the rods 90. For example, there are provided carton-engaging side guides 116 (2, 17, 20, 22, 24) and top flap guides 117 (17) adapted to respectively center the carton between the glue rolls 86 and guide the top side flaps thereof between the pairs of rolls 86 and 115. The side guides 116 are supported near their leading ends by ties 114 (20, 22, 23) and near their trailing ends in a manner to be described below. There is also provided a central hold down bar 118 (2, 17, 20) for closing the forward top flaps of passing cartons and holding closed both the forward and rearward top flaps of passing cartons. On a suitably extending arm 120 (17) is pivotally mounted a striking member 121 actuated by the air cylinder 122 and adapted to close the rearward top flap of passing cartons just prior to the passage of the passing cartons under the hold-down bar 118.

Supported on the vertically adjustable frame members 110 is a cross beam 125 (25, 26) from which are suspended by appropriate tying members the slide-bearings 126 which receive shafts 127 which in turn support squaring bars 128. The bars are actuated in and out by means of actuating cylinders 129 which have actuating rods 130 (25) associated therewith.

At the upstream end of the vertically adjustable frame members 110, the side members 116, which extend from the glue stand as previously described, are supported by means of vertical ties 123 (23, 24) and horizontal ties 124 (22–24) each of which has a slot for slidably adjustable connection with the respective vertical ties 123. These guide members support plow members 133 for initiating the inward folding of the top sideward flaps of passing cartons, which have had glue applied to them by the glue rolls 86. Such inward folding is completed by the striking members 134 adapted to be actuated by the air cylinders 135 also carried at the upstream end of the frame members 110 as illustrated in Figures 22–24.

The clutch-brake drive linkages for the belts 14 and 15 are illustrated more clearly in Figure 27. The motor and speed reducer assembly 17 constantly drives the shaft 137 by means of a magnetic clutch-brake 18 actuated through the lead 138. The output of the clutch-brake 18 through the chain 139 is alternately engaged with the constantly rotating shaft 137 in driven relationship therewith or is substantially instantaneously braked so that the output intermittently runs at an almost instantaneously attained speed and then stops almost instantaneously. Similarly, the brake-clutch 19 through the chain drive 140 powers the belt 15 for substantially instantaneous starting and stopping as governed by signals through the lead 141. A supplemental magnetic brake 142 is provided connected in parallel with the clutch-brake 19 so that actuation of the brake of the clutch-brake 19 simultaneously results in actuation of the brake 142 as by a signal received through the lead 143. Such supplemental brake is desirable because of the high number of starts and stops incident to the stapling operation to be described below.

*Stapling station*

Mounted below the conveying level at the stapling station 11 are a pair of wire-fed stapling heads 145 (29, 32) of conventional construction and supplied from a magazine 146 with stapling wire through flexible conduits 147, all as is conventional. The stapling heads 145 form part of the stapling guns 156 (2, 32) which are carried on mountings threadedly engaged with one or the other of the adjusting screws 148. These adjusting screws are of opposite hand and are associated on the same shaft which may be turned by means of the handwheel 144 to adjust the lateral positioning of the stapling guns. A frame cross-member 169 (32) along which the stapling gun mountings slide during such adjustment may be mounted by means of the springs 170 to absorb the repeated shock and pounding of the stapling operation.

Mounted along the stapling station 11 in one side of the conveyor means are a number of microswitches 150 (29) and associated arms 151 adapted to be engaged by passing cartons. Each of the microswitches 150 is associated by well known control means with solenoid controls and timers whereby as each switch 150 is closed, the clutch 19 is disengaged and the brake 142 is engaged to stop the belts 15 and 21, then air cylinders 152 are actuated in the extending direction, thereupon the stapling guns 145 are actuated, thereupon the cylinders 152 retract, and finally the brake 142 is disengaged and the clutch 19 is engaged, all in rapid succession.

The cylinders 152 are adapted to tighten depending portions of a pair of side guide rails 153, the lateral positions of which are adjusted by the pinion and rack links 154 (32) associated with the longitudinally extending shafts 155 (29, 32). The side guide members 153 are rigidly fixed to the rack portions of the rack and pinion linkage 154 as will be seen from Figure 32. The microswitches 150 are bodily carried on one of the side guide members 153. The depending portions 157 (32) of the side members 153 are normally urged outwardly by the tension springs 158. They are adapted to be engaged by the ends 159 of the actuating rods of the cylinders 152 to be urged inwardly. Preferably the members 157 have an inward face which is oriented slightly downwardly as indicated at 160 in Figure 32.

Supplemental rollers or wheels 162 may be provided to supplement the support of the belts 21 at central portions of the conveyor, if desired.

*Operation at the loading station 10*

A schematic sequence of operations at the loading station 10 is sequentially illustrated in Figures 33–47. It will be understood that certain portions of this sequence may not be essential to all aspects of the invention but that they are included in order that a most exhaustive and complete disclosure of the invention may be had.

Shown in Figure 33 in position slightly below the level of the rollers 26 of the conveyor sub-assemblies 25 are the pallet lifter members 40. The loading station 10 is at the moment empty and is ready to receive a pallet-loaded article, such as a dresser or the like.

Figure 34 illustrates the condition where a pallet-loaded dresser has just been received at the loading station. The sideward members 1 and 2 of the pallet ride on the rollers 26 and the cross-member 4 as well as the rearwardly located cross-member 3 support the legs of the dresser 23. The dresser and the pallet may be slightly askew with respect to the conveyor and also with respect to each other. As is typical of many articles of furniture, the dresser may have a relatively straight and uninterrupted rear side 35 but may have protruding members such as a pull handle 36 or the like on its front side.

Figure 35 illustrates the position of the parts when the clamping bars 50 are initially brought against the workpieces for purposes of conveniently squaring the furniture on the pallet and prior to any introduction of a paperboard carton over the furniture. To this end a suitable manual control may be moved to actuate the cylinders 72 and 66. Actuation of the cylinder 72 causes the frame assemblies 57 to move bodily in the inboard direction and actuation of the cylinder 66 causes the clamping bars to move bodily inwardly in advance of the frame assemblies until such time as the sides of the pallet are engaged between the lower portions of the clamping bars 50 at which time the pressure of the cylinder 66 may be overcome to allow the frame assemblies 57 to partially "catch up" to the clamping bars 50. It will be understood therefore that in closed or clamped position, the clamping bars 50 exert on the sides of the pallet a presure governed by the force which is exerted by the air cylinder 66 as modified by the mechanical advantage of the linkage 65. Even though only the lower portion of the clamping bars 50 engage the pallet, the clamping bars 50 maintain their vertical position due to the interference of the portion 76 (7) with the links 60.

The dresser may thereupon be conveniently manually shifted on the pallet by an operator to square it against the leftmost clamping bar 50 as seen in Figure 36. The operator may then reverse the manual control for the cylinders 72 and 66 causing the frame assembly links 57 and associated parts including the clamping bar 50 to withdraw, leaving the parts in the condition shown in Figure 37.

The condition of the parts when a carton is introduced over the workpiece at the carton loading station is illustrated in Figure 38 which may be considered conveniently together with Figure 11. The forward and rearward depending flaps of the carton pass between pairs of conveyor rolls. In the apparatus illustrated, the rearward flap 38 of the carton passes between pairs of the rolls 26 on each of the conveyor sub-assemblies 25 and the forward depending flap 9 passes between the stationary rolls 81. The sideward depending flaps including the flap 12 and its opposite member splay sidewardly outwardly on the rolls 26 and 81.

By having the forward and rearward relatively narrow flaps project between rolls, it becomes possible to upwardly fold these flaps merely by moving the workpiece backward and forward relative to the conveyor means. This may be done manually by simply bodily shifting the workpiece first in a forward direction to cause the leading flap 9 to be folded up under the corners of the pallet members 1 and 2 between adjacent rolls 81 and then moving the workpiece bodily rearwardly to cause the rearward lower flap 38 to be folded upwardly by the adjacent rolls 26.

However, according to one important aspect of the invention, this upfolding of the forward and rearward lower flaps may be much more readily and efficiently accomplished by an arrangement such that there simultaneously occurs relative movement of the workpieces toward both the upstream and downstream portions of the roller conveyor means then associated therewith. Thus, the operator may move a manual control actuating the cylinder 33 (11, 13) causing both the conveyor sub-assemblies 25 to move to the right as viewed in Figures 11–13. The forward and rearward lower flaps will then be upfolded as illustrated sequentially in Figures 11 and 12. The position of the parts in the series of sequential drawings will then be that illustrated in Figure 39. Actually, the thickness of the rearward flap 38 is sandwiched between the rearward ends of the pallet members 1 and 2 and the tops of the rolls 26. However the members 1 and 2 are shown as contacting the tops of the rolls 26 in Figure 39 because their center portions will bow downwardly to accomplish such contact. Only the endward portions of these pallet members will be slightly raised by the thickness of the rearward flap 38 and the forward flap 9 while the structure is being supported on the rolls 26 and 81.

Following infolding of the forward and rearward flaps 9 and 38, the actuating rod of the cylinder 33 may be retracted as by release of a manual control by the operator.

Figure 40:
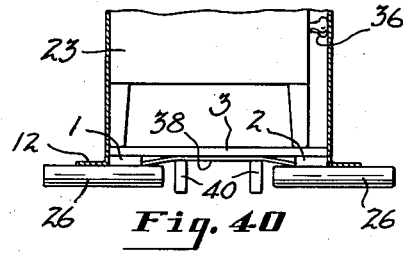

Following infolding of the forward and rearward flaps as above described, the pallet lifter members 40 are raised by actuation of the cylinder 41. This may be initiated by the operator manipulating a suitable manual control. As the cylinder 41 is actuated, the cylinders 72 and 66 may be simultaneously actuated to cause the clamping bars 50 (not seen in Figures 40 and 41) to start to move inwardly. This may be accomplished by putting conventional solenoid controls for the valves associated with the cylinders 41, 72 and 66 in parallel so that actuation of the cylinder 41 automatically causes actuation of the cylinders 72 and 66. The initial portion of the upward movement of the pallet lifter members 40 is illustrated in Figure 40, the lifting members having engaged the rearward and forward flaps 38 and 9 and lifted them upwardly against the undersides of the rearward cross-member 3 and the forward cross-member 4 of the pallet. The carton is prevented from being bodily lifted relatively to the dresser at this stage by the fact that the flaps 38 and 9 are engaged under the ends of the pallet's lower members 1 and 2.

Figure 41:
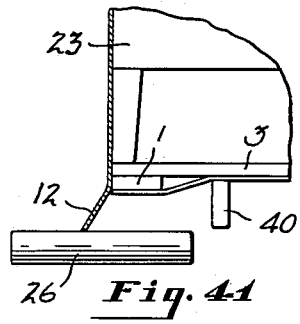

As the pallet lifter members 40 continue in their upward movement, the full weight of the workpiece is carried thereby. An intermediate position in such lifting is illustrated in Figure 41.

Figure 42:
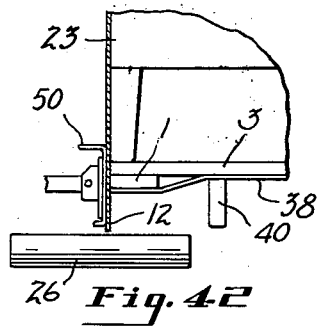
Figure 45:
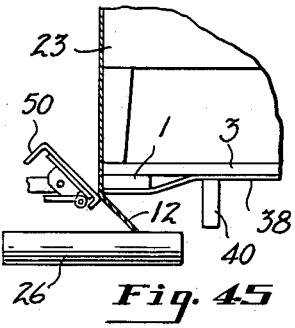

Shortly prior to or during such intermediate condition or shortly thereafter as the parts continue in their upward movement, the clamping bars 50 which have meanwhile been moving inward in the clamping direction yieldingly engage the sides of the pallet as indicated in Figure 42. Underfolding of the lower side flaps 12 is thereby started at least to the extent of infolding these flaps to a downwardly vertical depending position.

The subsidiary linkage means which is actuated by the air cylinder 77, and comprising the rollers 78 (7A, 10) which ride on the back side of the clamping bars 50, may be actuated at this time in sequence of operations to yieldingly urge the clamping bars 50 to pivot toward the attitude at which their clamping faces slant upwardly. In this connection, the solenoid for the control valve of the cylinder 77 may be interconnected with the remainder of the control circuits to be in parallel with the control for the cylinders 41 so that when the cylinder 41 (5, 6, 13) is actuated, the cylinder 77 is actuated as well as the cylinders 66 and 72. However the pressure exerted by the cylinders 77 is resisted by the pallet cross-members 3 and 4 so that the clamping bars 50 remain vertical in position of the parts shown in Figure 42.

Figure 44:
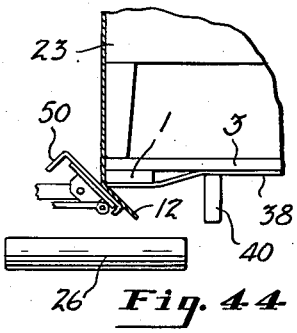
Figure 43:
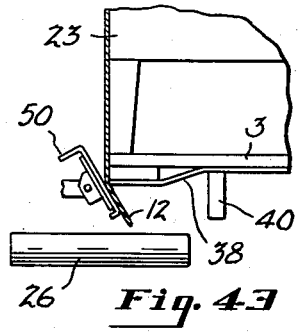

As the pallet lifter members continue in their upward movement, the lower corners of the pallet members 1 and 2 pass above the longitudinally extending pivot axes of the clamping bars 50 whereupon the clamping bars 50 start to pivot inwardly as shown in Figure 43 toward an innermost position corresponding to the fully expanded condition of the subsidiary linkage including the cylinders 77 and rollers 78. This innermost condition of the clamping bars 50 is shown in Figure 44 (see also Figure 7A) and may correspond to the extreme limit of upward movement of the pallet lifter members 40. However, it may be that the pallet lifter members 40 continue to move upwardly a slight additional amount. If there is such slight additional movement, the subsequent lowering of the pallet lifter members will presently return the parts to the condition shown in Figure 44.

Lowering of the pallet members may be mnaually initiated by the operator by reversing the solenoid control for the valve associated with the cylinders 41 or this reversal may be made automatic after a suitably timed interval by conventional timing means. Such reversal of the cylinder 41 may, by the previously mentioned parallel control connections, cause the cylinders 72, 66 and 77 to be actuated in the retracting direction. It will be seen that in the condition of Figures 43 and 44, the side flaps 12 are partially inwardly folded. As the pallet lifter members 40 continue to move downwardly, the parts reach the condition shown in Figure 45. Then as lowering continues and as the clamping bars 50 simultaneously are removed to the side, the parts assume the condition shown in Figure 46.

Figure 47:
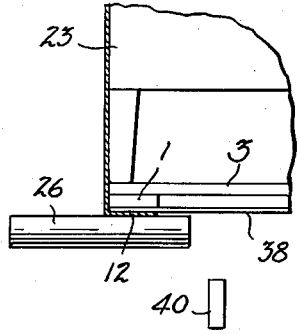
Figure 46:
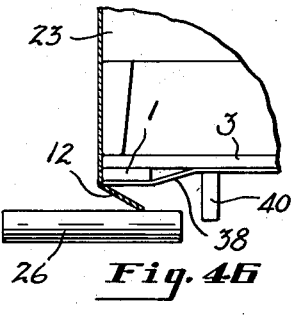

Upon continued downward movement from the condition shown in Figure 46, the side flaps 12 are caught under the side members 1 and 2 of the pallet as illustrated in Figure 47 to complete the underfolding of the four lower flaps. The long underfolded side flaps 12 extend the length of the pallet members 1 and 2. The carton and its contents may thereupon be merely manually pushed from the loading station 10 sufficiently further along the conveyor means to be taken up by the belt 13 to be sequentially automatically moved down the remainder of the length of the illustrated apparatus as described below.

*Operation between the loading station 10 and stapling station 11*

As the carton and its contents are taken up by the belt 13, the carton is centraly guided by the side guide members 116. The top sideward flaps 8 of the carton are guided by the members 117 to a position roughly level with the bight between the glue rolls 86 and their associated rolls 115. The forward top flap 6 is infolded by contact with the member 118. The carton proceeds through the glue applying stand and glue is applied to the upwardly facing sides of the flaps 8 which will ultimately become the inner sides of these flaps. As progress through this stand continues, the carton strikes a microswitch 164 (2) causing actuation of the cylinder 122 whereby the rearward top flap 7 is infolded to be thereupon held in infolded position by the hold-down bar 118.

As the carton continues along the conveyor means from the glue stand on the constantly running belt 13, it contacts a microswitch 165 which is connected in parallel with a succeeding microswitch 166 so that closing of one or both of these switches initiates and maintains the operations to be described below and the cessation of such operations occurs only upon reopening of both the microswitches 165 and 166.

Closing the switch 165 causes the cylinders 135 to be actuated to move the striking members 134 in the inward direction to inwardly fold the flaps 8 which have meanwhile been guided in an upwardly extending vertical position by the plow members 133. At the same time, the cylinders 129 are actuated in the retracting direction to move the squaring bars 128 away from any carton that may be located therebetween and to engage the clutch 18 to initiate movement of the belt 14 to carry any such carton in the downstream direction.

As the incoming carton continues to pass along in contact with the microswitches 165 and 166, it passes from the constantly moving belt 13 to the now-moving belt 14, and it continues its movement until the microswitch 166 has been passed at which time both the microswitches 165 and 166 become open, the cylinders 135 are reversed to retract the striking members 134, the clutch 18 is disengaged to stop the belt 14 and the cylinders 129 are reversed to bring the squaring bars 128 into contact with sides of the carton.

Cartons which have passed the squaring bars 128 and which are carried along the belt 14 arrive at the roller conveyor portion 167 (1) at which there are no belts and are subsequently urged across this portion by succeeding cartons. The portion 167 accomplishes an inertia break between the belts 14 and 15.

*Operation at the stapling station 11*

As the carton proceeds onto the belt 15, it is taken up thereby. The belt 15 moves constantly except for timed cycles initiated by closing of one of the microswitches 150. The microswitches 150 are connected in parallel; closing of any of them will initiate cycling of the timing switch 149 (29) which successively actuates solenoid controls to disengage the clutch 19 and engage the brake 142, to then actuate the cylinders 152 (29, 32) to thereby clamp the lower portion 157 of the guide rails 153 against the sides of the pallet, to thereupon fire the stapling guns 145 to drive a staple through the bottom side flaps 12 and into the pallet end side members 1 and 2, to thereupon retract the cylinders 152, and to finally release the brake 142 and engage the clutch 19 to again start the belt 15 which runs for an interval of time until a succeeding microswitch 150 is closed. In the apparatus illustrated, this sequence of operations repeats itself seven times to drive seven staples into each of the bottoms of the pallet members 1 and 2. The relationship may be such that the first and last pairs of staples driven into each pallet are driven through the forward or rearward bottom flaps as well as one of the sideward flaps, as indicated in Figure 32. After the cycle of operations following closing of the last of the successive microswitches, the belt 15 runs constantly until another carton contacts and closes the first of the microswitches 150. In accordance with well-known expedients, the arrangement is such that closing of the microswitches is effective to start the above described cycle but once the microswitches have been actuated in the closing direction they are in effect open switches until such time as their arms have again moved to the initial open position to be subsequently displaced therefrom by a succeeding carton.

The underside of a carton which has passed through the apparatus is illustrated in Figure 32A.

The space between the two belts 21 is provided in order that there may be positioned therebetween a supplemental stapling head useful for stapling articles which are not pallet-supported such as relatively light furniture. One example is night stands. These relatively light articles may not require pallets and may be readily manually packed in cartons including relatively wide outer bottom flaps 201 and 202 (32B) and inner bottom flaps 203 and 204. A stapling head 206 (29) may be provided of a known type which requires no anvil and which puts its own anvil temporarily under layers of paperboard to be stapled together as by puncturing the paperboard with a steel member which slides in underneath one slide of the paperboard area which is to receive the staple. Thus a series of staples may secure the bottom flaps 201 and 202 together as indicated in Figure 32B. It is understood that this no-anvil stapling means forms no part of the present invention but is illustrated here merely to indicate that the apparatus of the invention may be employed consistently with furniture packaging operations not involving palletizing.

It will be apparent that a great variety of carton sizes may be accommodated in the illustrated apparatus through adjustments in the lateral spacing of various side guide members and through raising and lowering of the members supported by the hanger chains 109.

It will be apparent that many variations in the many details of the illustrated apparatus will be possible. The invention is not limited to these details and its scope is to be determined by the following claims.

What is claimed is:

1. Apparatus for packaging pallet-mounted bulky objects in paperboard cartons which are introduced to such apparatus in the form of rectangular tubes having forward, rearward, and sideward upstanding flaps at their upper ends and also having forward, rearward, and sideward depending flaps of relatively narrow dimensions at their lower ends, comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for stapling said underfolded sideward flaps to the undersides of said pallets.

2. Packaging apparatus for enclosing pallet-mounted bulky objects in paperboard cartons which are introduced to such apparatus in the form of rectangular tubes having forward, rearward, and sideward upstanding flaps at their upper ends and also having forward, rearward, and sideward depending flaps of relatively narrow dimensions at their lower ends, comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bar linkage means including lost motion means for yielding upon reaching a given clamping pressure during movement in said clamping direction, said clamping bars being mounted for pivoting movement about axes oriented in said conveying direction from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for stapling to the undersides of said pallets the said underfolded sideward flaps.

3. Packaging apparatus for enclosing in paperboard cartons bulky objects which are mounted on pallets, the cartons being introduced to said apparatus in the form of rectangular tubes having forward, rearward, and sideward depending narrow flaps at their lower ends, comprising conveyor line means having underside-engaging work-supporting conveyor elements leading in a conveying path past a carton loading station and a stapling station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bar linkage means including lost motion means for yielding upon reaching a given clamping pressure during movement in said clamping direction, said clamping bars being mounted for pivoting movement about axes oriented in said conveying direction from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for affixing said underfolded sideward flaps to the undersides of said pallets with staple fastenings.

4. Apparatus for packaging pallet-mounted bulky objects in paperboard cartons, the cartons being introduced to said apparatus in the form of rectangular tubes having forward, rearward, and sideward depending narrow flaps at their lower ends, comprising conveyor line means having underside-engaging work-supporting conveyor elements leading in a conveying path past a carton loading station and a stapling station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means for stapling said underfolded sideward flaps to the undersides of said pallets at said stapling station.

5. In the packaging of pallet-mounted bulky objects in paperboard cartons which are provided in the form of rectangular tubes having forward, rearward, and sideward upstanding flaps at their upper ends and also having forward, rearward, and sideward depending flaps of relatively narrow dimensions at their lower ends, apparatus comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof, means at said stapling station for stapling said underfolded sideward flaps to the undersides of said pallets including upwardly aimed stapling guns immediately below said conveying path both sides of passing cartons and side guide rails on either side of the path of passing cartons and means for momentarily tightening said guide rails against the lower sides of passing cartons to restrain pallets within said cartons against vertical movement, said conveyor elements comprising at said stapling station intermittently operating conveyor belt means and control means for activating said guide rail tightening means and firing said stapling guns during the dwells of said intermittently operating conveyor belt means.

6. Packaging apparatus for enclosing in paperboard cartons bulky objects which are mounted on pallets, the cartons being introduced to said apparatus in the form of rectangular tubes having at least depending sideward narrow flaps at their lower ends, comprising conveyor line means having underside-engaging work-supporting conveyor elements leading in a conveying path past a carton loading station and a stapling station, said conveyor elements comprising means at said loading station adjacent which may be received said sideward depending flaps of said cartons introduced at said carton loading station, pallet lifter members extendible upwardly at said carton loading station from the level of said conveyor elements, parallel clamping bars on opposite sides of said loading station, said clamping bars having opposed clamping faces, clamping bar linkage means for moving said clamping bars toward and away from each other in clamping and unclamping directions respectively above the level of said conveyor elements, said clamping bar linkage means including lost motion means for yielding upon reaching a given clamping pressure during movement in said clamping direction, said clamping bars being mounted for pivoting movement about axes extending longitudinally thereof from attitudes in which said clamping faces are vertical to attitudes in which said clamping faces slant upwardly, elevating means for actuating said pallet lifter members for raising them above the said axes of pivoting movement of said clamping bars and thereupon lowering them to said level of said conveyor elements, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said conveyor elements whereby said partially underfolded sideward flaps of said cartons collapse inwardly on said conveyor elements to complete underfolding thereof, means at said stapling station for stapling said underfolded sideward flaps to the undersides of said pallets and including upwardly aimed stapling guns immediately below said conveying path underneath both sides of passing cartons and side guide rails on either side of the path of passing cartons and means for momentarily tightening said guide rails against the lower sides of passing cartons to restrain pallets within said cartons against vertical movement.

7. In the packaging of pallet-mounted bulky objects in paperboard cartons which are provided in the form of rectangular tubes having forward, rearward, and sideward depending narrow flaps at their lower ends, apparatus comprising conveyor line means having underside-engaging work-supporting conveyor elements leading in a conveying path past a carton loading station and a stapling station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof, means at said stapling station for stapling said underfolded sideward flaps to the undersides of said pallets including upwardly aimed stapling guns immediately below said conveying path underneath both sides of passing cartons and side guide rails on either side of the path of passing cartons and means for momentarily tightening said guide rails against the lower sides of passing cartons to restrain pallets within said cartons against vertical movement, said conveyor elements comprising at said stapling station intermittently operating conveyor belt means and control means for activating said guide rail tightening means and firing said stapling guns during the dwells of said intermittently operating conveyor belt means.

8. Packaging apparatus for enclosing in paperboard cartons bulky objects which are mounted on pallets, the cartons being introduced to said apparatus in the form of rectangular tubes having at least depending forward and rearward narrow flaps at their lower ends, comprising conveyor line means having underside-engaging work-supporting conveyor elements leading in a conveying path past a carton loading station and a stapling station, said conveyor elements comprising at said loading station roller conveyor means including a plurality of rolls downwardly past which pass said forward and rearward depending flaps of said cartons introduced at said carton loading station, whereby movement of emplaced cartons and upstream conveyor elements relatively toward each other underfolds said rearward depending flaps beneath said pallets and movement of emplaced cartons and downstream conveyor elements relatively toward each other underfolds said forward depending flaps beneath said pallets and means at said stapling station for stapling said underfolded forward and rearward flaps to the undersides of said pallets.

9. In the art of enclosing pallet-mounted bulky objects in paperboard cartons which are provided in the form of rectangular tubes having forward, rearward, and sideward upstanding flaps at their upper ends and also having forward, rearward, and sideward depending flaps of relatively narrow dimensions at their lower ends, apparatus comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for applying staples whereby said underfolded sideward flaps and said pallets are fastened together.

10. Packaging apparatus for use in the packaging of pallet-mounted bulky objects in paperboard cartons which are provided in the form of rectangular tubes having forward, rearward, and sideward upstanding flaps at their upper ends and also having forward, rearward, and sideward depending flaps of relatively narrow dimensions at their lower ends, comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for applying staples whereby said pallets and said underfolded sideward flaps are secured to each other.

11. Apparatus useful in the art of enclosing in paperboard cartons bulky objects which are mounted on pallets, the cartons being introduced to said apparatus in the form of rectangular tubes having at least depending sideward narrow flaps at their lower ends, comprising conveyor line means having underside-engaging work-supporting conveyor elements leading in a conveying path past a carton loading station and a stapling station, said conveyor elements comprising means at said loading station adjacent which may be received said sideward depending flaps of said cartons introduced at said carton loading station, pallet lifter members extendible upwardly at said carton loading station from the level of said conveyor elements, parallel clamping bars on opposite sides of said loading station, said clamping bars having opposed clamping faces, clamping bar linkage means for moving said clamping bars toward and away from each other in clamping and unclamping directions respectively above the level of said conveyor elements, said clamping bars being mounted for pivoting movement about axes extending longitudinally thereof from attitudes in which said clamping faces are vertical to attitudes in which said clamping faces slant upwardly, elevating means for actuating said pallet lifter members for raising them above the said axes of pivoting movement of said clamping bars and thereupon lowering them to said level of said conveyor elements, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said conveyor elements whereby said partially underfolded sideward flaps of said cartons collapse inwardly on said conveyor elements to complete underfolding thereof and means at said stapling station for stapling said underfolded sideward flaps to the undersides of said pallets.

12. In the enclosing of pallet-mounted bulky objects in paperboard cartons which are provided in the form of rectangular tubes having forward, rearward, and sideward depending narrow flaps at their lower ends, apparatus comprising conveyor line means having underside-engaging work-supporting conveyor elements leading in a conveying path past a carton loading station and a stapling station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bar linkage means including lost motion means for yielding upon reaching a given clamping pressure during movement in said clamping direction, said clamping bars being mounted for pivoting movement about axes oriented in said conveying direction from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means for stapling said underfolded sideward flaps to the undersides of said pallets at said stapling station.

13. Apparatus for packaging pallet-mounted bulky objects in paperboard cartons which are introduced to such apparatus in the form of rectangular tubes having forward, rearward, and sideward upstanding flaps at their upper ends and also having forward, rearward, and sideward depending flaps of relatively narrow dimensions at their lower ends, comprising conveyor line means having underside-engaging work-supporting conveyor elements leading in a conveying path past a carton loading station and a stapling station, top flap gluing, infolding, and sealing means located on said conveyor line means intermediate said loading station and said stapling station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bar linkage means including lost motion means for yielding upon reaching a given clamping pressure during movement in said clamping direction, said clamping bars being mounted for pivoting movement about axes oriented in said conveying direction from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof, means at said stapling station for stapling said underfolded sideward flaps to the undersides of said pallets including upwardly aimed stapling guns immediately below said conveying path underneath both sides of passing cartons and side guide rails on either side of the path of passing cartons and means for momentarily tightening said guide rails against the lower sides of passing cartons to restrain pallets within said cartons against vertical movement, said conveyor elements comprising at said stapling station intermittently operating conveyor belt means and control means for activating said guide rail tightening means and firing said stapling guns during the dwells of said intermittently operating conveyor belt means.

14. Packaging apparatus for enclosing in paperboard cartons bulky objects which are mounted on pallets, the cartons being introduced to said apparatus in the form of rectangular tubes having at least depending forward and rearward narrow flaps at their lower ends, comprising conveyor line means having underside-engaging work-supporting conveyor elements leading in a conveying path past a carton loading station and a stapling station, said conveyor elements comprising at said loading station roller conveyor means including a plurality of rolls downwardly past which pass said forward and rearward depending flaps of said cartons introduced at said carton loading station, whereby movement of emplaced cartons and upstream conveyor elements relatively toward each other underfolds said rearward depending flaps beneath said pallets and movement of emplaced cartons and downstream conveyor elements relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said conveyor elements on the other hand and means at said stapling station for stapling said underfolded forward and rearward flaps to the undersides of said pallets.

15. Packaging apparatus for enclosing in paperboard cartons bulky objects which are mounted on pallets, the cartons being introduced to said apparatus in the form of rectangular tubes having forward, rearward, and sideward depending narrow flaps at their lower ends, comprising conveyor line means having underside-engaging work-supporting conveyor elements leading in a conveying path past a carton loading station and a stapling station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes orented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for stapling to the undersides of said pallets the said underfolded sideward flaps.

16. Packaging apparatus for enclosing in paperboard cartons bulky objects which are mounted on pallets, the cartons being introduced to said apparatus in the form of rectangular tubes having at least depending sideward narrow flaps at their lower ends, comprising conveyor line means having underside-engaging work-supporting conveyor elements leading in a conveying path past a carton loading station and a stapling station, said conveyor elements comprising means at said loading station adjacent which may be received said sideward depending flaps of said cartons introduced at said carton loading station, pallet lifter members extendible upwardly at said carton loading station from the level of said conveyor elements, parallel clamping bars on opposite sides of said loading station said clamping bars having opposed clamping faces, clamping bar linkage means for moving said clamping bars toward and away from each other in clamping and unclamping directions respectively above the level of said conveyor elements, said clamping bar linkage means including lost motion means for yielding upon reaching a given clamping pressure during movement in said clamping direction, said clamping bars being mounted for pivoting movement about axes extending longitudinally thereof from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members for raising them above the said axes of pivoting movement of said clamping bars and thereupon lowering them to said level of said conveyor elements, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said conveyor elements whereby said partially underfolded sideward flaps of said cartons collapse inwardly on said conveyor elements to complete underfolding thereof and means at said stapling station for affixing said underfolded sideward flaps to the undersides of said pallets with staple fastenings.

17. Packaging apparatus for enclosing pallet-mounted bulky objects in paperboard cartons which are introduced to such apparatus in the form of rectangular tubes having forward, rearward, and sideward upstanding flaps at their upper ends and also having forward, rearward, and sideward depending flaps of relatively narrow dimensions at their lower ends, comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bar linkage means including lost motion means for yielding upon reaching a given clamping pressure during movement in said clamping direction, said clamping bars being mounted for pivoting movement about axes oriented in said conveying direction from attitudes in which said clamping faces are vertical to attitudes in which said clamping faces slant upwardly, subsidiary linkage means for yieldingly urging said clamping bars to pivot toward said latter attitudes, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and for activating said subsidiary linkage means to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for applying staples whereby said pallets and said underfolded sideward flaps are secured to each other.

18. Packaging apparatus for enclosing in paperboard cartons bulky objects which are mounted on pallets, the cartons being introduced to said apparatus in the form of rectangular tubes having at least depending sideward narrow flaps at their lower ends, comprising conveyor line means having underside-engaging work-supporting conveyor elements leading in a conveying path past a carton loading station and a stapling station, said conveyor elements comprising means at said loading station adjacent which may be received said sideward depending flaps of said cartons introduced at said carton loading station, pallet lifter members extendible upwardly at said carton loading station from the level of said conveyor elements, parallel clamping bars on opposite sides of said loading station, said clamping bars having opposed clamping faces, clamping bar linkage means for moving said clamping bars toward and away from each other in clamping and unclamping directions respectively above the level of said conveyor elements, said clamping bars being mounted for pivoting movement about axes extending longitudinally thereof from attitudes in which said clamping faces are vertical to attitudes in which said clamping faces slant upwardly, elevating means for actuating said pallet lifter members for raising them above the said axes of pivoting movement of said clamping bars and thereupon lowering them to said level of said conveyor elements, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said conveyor elements whereby said partially underfolded sideward flaps of said cartons collapse inwardly on said conveyor elements to complete underfolding thereof, means at said stapling station for stapling said underfolded sideward flaps to the undersides of said pallets including upwardly aimed stapling guns immediately below said conveying path underneath both sides of passing cartons and side guide rails on either side of the path of passing cartons and means for momentarily tightening said guide rails against the lower sides of passing cartons to restrain pallets within said cartons against vertical movement, said conveyor elements comprising at said stapling station intermittently operating conveyor belt means and control means for activating said guide rail tightening means and firing said stapling guns during the dwells of said intermittently operating conveyor belt means.

19. Apparatus for packaging pallet-mounted bulky objects in paper board cartons, the cartons being introduced to said apparatus in the form of rectangular tubes having forward, rearward, and sideward depending narrow flaps at their lower ends, comprising conveyor line means having underside-engaging work-supporting conveyor elements leading in a conveying path past a carton loading station and a stapling station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for applying staples whereby said underfolded sideward flaps and said pallets are fastened together.

20. In the packaging of pallet-mounted bulky objects in paperboard cartons which are provided in the form of rectangular tubes having forward, rearward, and sideward depending narrow flaps at their lower ends, apparatus comprising conveyor line means having underside-engaging work-supporting conveyor elements leading in a conveying path past a carton loading station and a stapling station, said conveyor elements comprising at said loading station roller conveyor means including a pair of roller conveyor subassemblies extending parallel to each other in the conveying direction in laterally spaced relationship to define a gap therebetween, pallet lifter members extendible upwardly at said carton loading station from said gap and from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, a portion of said plurality of rolls being reciprocable back and forth in said conveying direction to effect at least a part of said relative movement toward each other of said emplaced cartons on the one hand and said upstream and downstream portions of said roller conveyor means on the other hand, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means for stapling said underfolded sideward flaps to the undersides of said pallets at said stapling station.

21. In the packaging of pallet-mounted bulky objects in paperboard cartons which are provided in the form of rectangular tubes having forward, rearward, and sideward upstanding flaps at their upper ends and also having forward, rearward, and sideward depending flaps of relatively narrow dimensions at their lower ends, apparatus comprising conveyor line means having underside-engaging work-supporting conveyor elements leading in a conveying path past a carton loading station and a stapling station, top flap gluing, infolding, and sealing means located on said conveyor line means downstream of said carton loading station, said conveyor elements comprising at said loading station roller conveyor means including a plurality of rolls, pallet lifter members extendible upwardly at said carton loading station from the level of said roller conveyor means, whereby said forward and rearward depending flaps of said cartons introduced at said carton loading station pass between pairs of said conveyor rolls and said sideward depending flaps of said cartons splay sidewardly outwardly on said conveyor rolls and movement of emplaced cartons and upstream portions of said roller conveyor means relatively toward each other underfolds said rearward depending flaps beneath said pallets and movement of emplaced cartons and downstream portions of said roller conveyor means relatively toward each other underfolds said forward depending flaps beneath said pallets, parallel clamping bars oriented longitudinally of said roller conveyor means on either side thereof and having opposed clamping faces, clamping bar linkage means for moving said clamping bars toward and away from each other in clamping and unclamping directions respectively above the level of said roller conveyor means, said clamping bars being mounted for pivoting movement about axes oriented in said conveying direction from attitudes in which said clamping faces are vertical to attitudes in which said clamping faces slant upwardly, elevating means for actuating said pallet lifter members following said underfolding of said forward and rearward depending flaps of said emplaced cartons for raising said pallet lifter members above the said axes of pivoting movement of said clamping bars and for thereupon lowering them to said level of said roller conveyor means, control means for concurrently actuating said clamping bar linkage means respectively in said clamping direction to engage said clamping bars with emplaced cartons and to underfold partially said sideward depending flaps of said cartons and thereupon in said unclamping direction to accommodate said lowering of said pallet lifter members to said level of said roller conveyor means whereby said partially underfolded sideward flaps of said cartons collapse inwardly on said conveyor rolls to complete underfolding thereof and means at said stapling station for affixing said underfolded sideward flaps to the undersides of said pallets with staple fastenings.

No references cited.